US008225065B2

(12) United States Patent
Reynya et al.

(10) Patent No.: US 8,225,065 B2
(45) Date of Patent: Jul. 17, 2012

(54) HIERARCHICAL SCALABLE MEMORY ALLOCATOR

(75) Inventors: Georgiy I. Reynya, Redmond, WA (US); Rajesh B. Iyer, Baltimore, MD (US); Madhan R. Arumugam, Sammamish, WA (US); Rusi Hosang Hilloowala, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 282 days.

(21) Appl. No.: 12/792,734

(22) Filed: Jun. 3, 2010

(65) Prior Publication Data
US 2011/0302388 A1 Dec. 8, 2011

(51) Int. Cl.
*G06F 12/00* (2006.01)
(52) U.S. Cl. ........................................ 711/170
(58) Field of Classification Search .................. None
See application file for complete search history.

(56) References Cited

U.S. PATENT DOCUMENTS

| 5,561,786 | A | * | 10/1996 | Morse .................. 711/170 |
| 5,784,699 | A | * | 7/1998 | McMahon et al. ........... 711/171 |
| 6,175,900 | B1 | | 1/2001 | Forin et al. |
| 7,246,216 | B2 | | 7/2007 | Swan |
| 7,315,894 | B2 | | 1/2008 | Huntington et al. |
| 2005/0268049 | A1 | | 12/2005 | De Lange |
| 2007/0067366 | A1 | | 3/2007 | Landis |
| 2007/0214314 | A1 | | 9/2007 | Reuter |
| 2009/0234897 | A1 | | 9/2009 | Qi et al. |

OTHER PUBLICATIONS

Berger, et al., "Hoard: A Scalable Memory Allocator for Multithreaded Applications", Retrieved at << http://www.cs.umass.edu/~emery/pubs/berger-asplos2000.pdf >>, ACM SIGPLAN Notices, vol. 35, No. 11, Nov. 2000, pp. 12.

* cited by examiner

*Primary Examiner* — Hiep Nguyen

(57) ABSTRACT

Aspects of the subject matter described herein relate to memory management. In aspects, a hierarchical, customized memory allocator may be created that allocates memory to memory consumers. The memory allocator may use a data structure to classify blocks of memory at each level in the hierarchy according to fill factors of the blocks of memory. Allocations may be based on lifetime characteristics, proximity to consumer, fill factor, and other factors. An allocator may use one or more active blocks to allocate memory to consumers. The number of active blocks for an allocator may depend on contention.

20 Claims, 8 Drawing Sheets

HIERARCHICAL SCALABLE MEMORY ALLOCATOR

BACKGROUND

On computers, applications request, use, and release memory. For example, when an application opens a file, the application or other component may request memory for creating data structures related to the file. As another example, when a user browses to a Web site, a Web browser may request memory for storing content from the Web site in preparation for rendering the content on a display. After the user closes the browser, the Web browser may indicate that the memory used for storing and rendering content of the previous Web site may be released and returned to a memory pool.

Servers that handle requests from other computers often have greater pressure to efficiently use memory than client computers. In both client and server machines, an inefficient memory manager may waste memory and lead to poor performance. Unfortunately, a memory manager that works well with some memory consumers may not work well with other memory consumers.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to memory management. In aspects, a hierarchical, customized memory allocator may be created that allocates memory to memory consumers. The memory allocator may use a data structure to classify blocks of memory at each level in the hierarchy according to fill factors of the blocks of memory. Allocations may be based on lifetime characteristics, proximity to consumer, fill factor, and other factors. An allocator may use one or more active blocks to allocate memory to consumers. The number of active blocks for an allocator may depend on contention.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
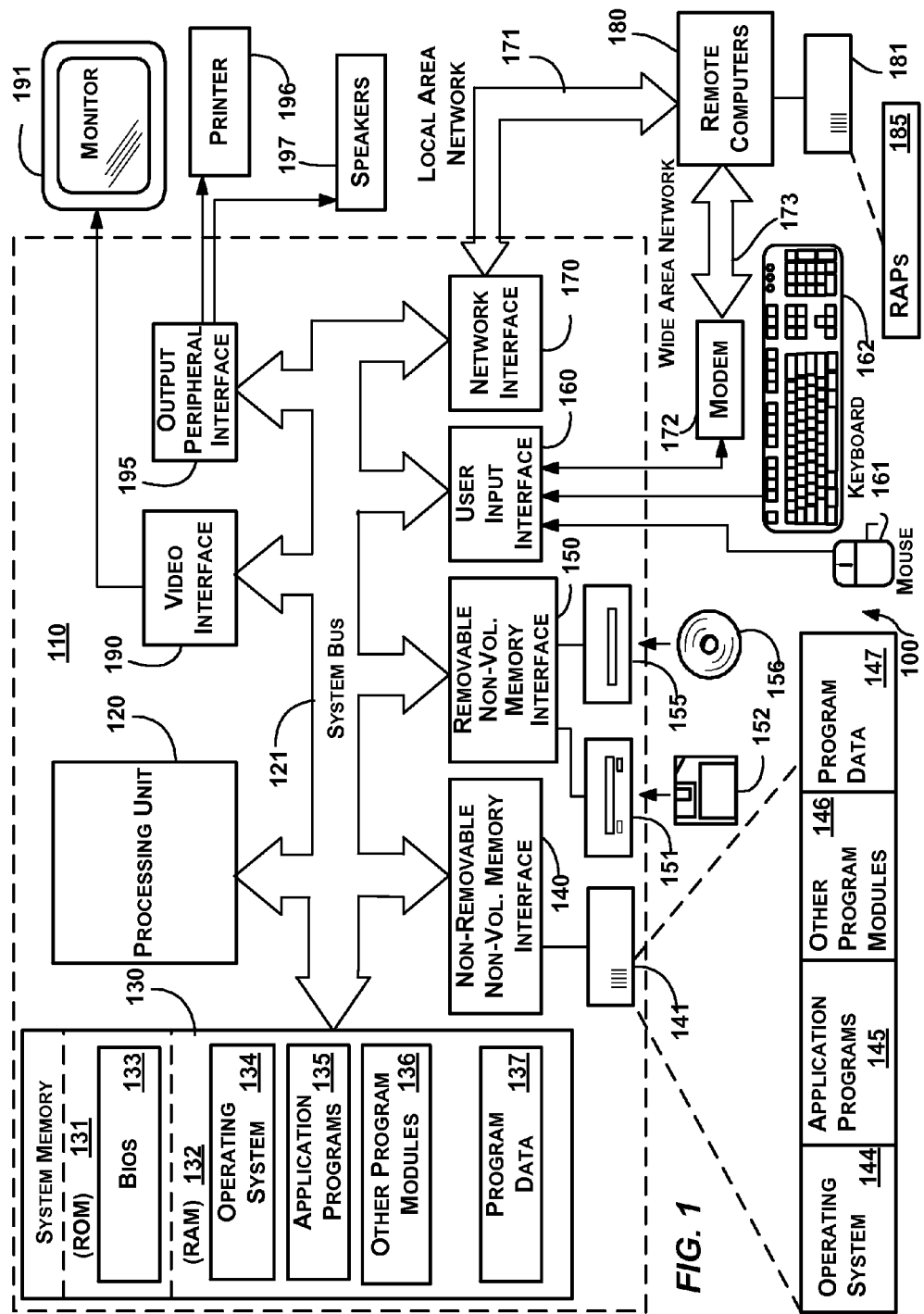
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, solid state devices, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs (RAPs) 185 as residing on memory device 181. It will be appreciated that the network connections shown are exemplary and other means of establishing a communications link between the computers may be used.

Memory Management

Figure 2:
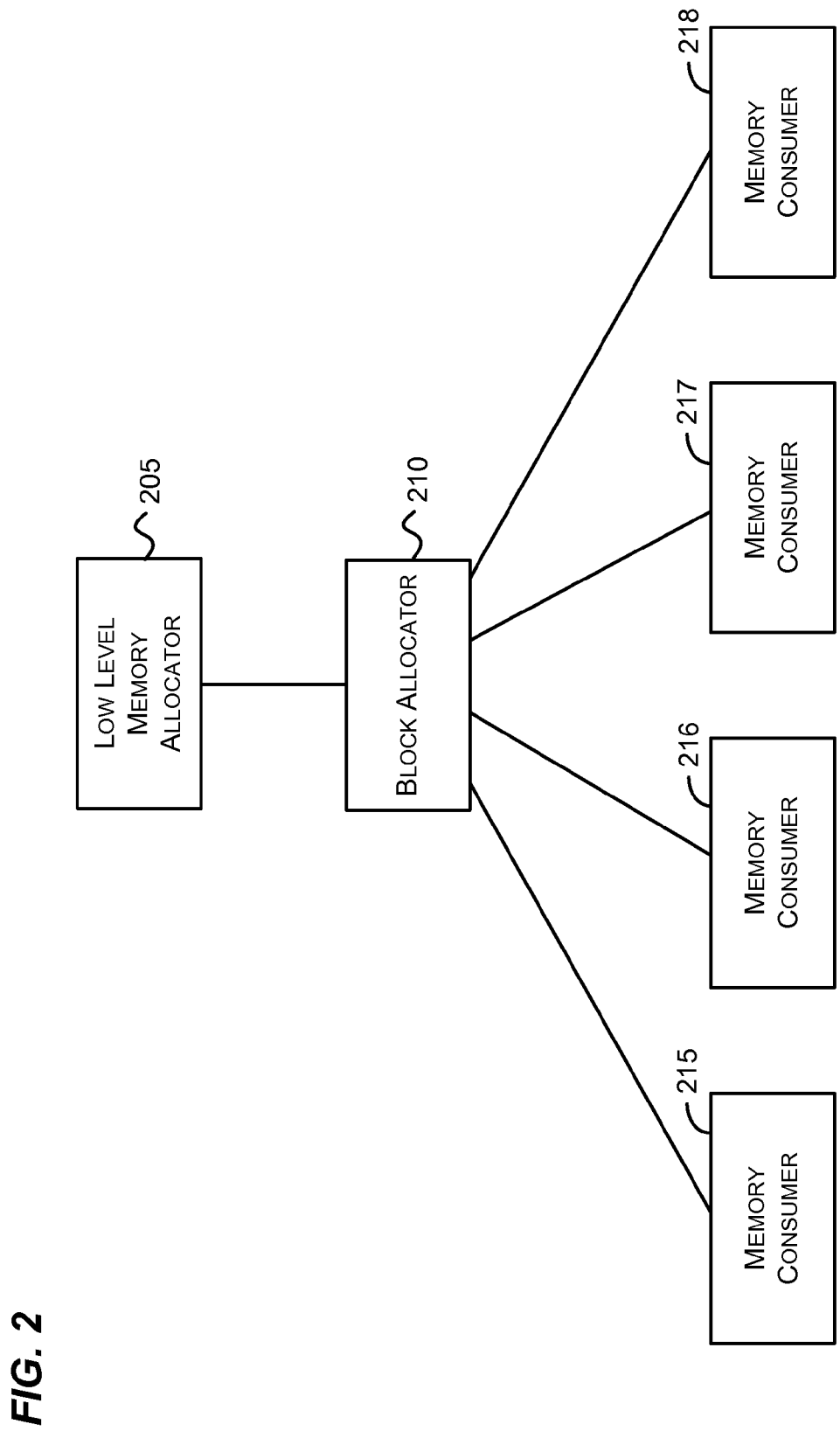
FIG. 2 is a block diagram representing an exemplary environment in which aspects of the subject matter described herein may be implemented.

As mentioned previously, inefficient memory management may lead to wasted memory, poor performance, and other problems. FIG. 2 is a block diagram representing an exemplary environment in which aspects of the subject matter described herein may be implemented. The environment may include a low level memory allocator 205 (hereinafter sometimes referred to as the memory allocator 205), a block allocator 210, one or more memory consumers 215-218, and may include other entities (not shown).

Allocators as used herein may include or be comprised of one or more components that allocate and de-allocate memory. In one embodiment, each allocator may be implemented as a separate software object. In another embodiment, one or more components may implement multiple allocators. As used herein, the term component is to be read to include all or a portion of a device, a collection of one or more software modules or portions thereof, some combination of one or more software modules or portions thereof and one or more devices or portions thereof, and the like.

Herein, where references are made to multiple allocators, these references are also to be construed, in other embodiments, to cover a single allocator that performs the actions indicated. Thus a "hierarchy" of allocators may refer to a single allocator that allocates and de-allocates blocks of memory in a similar fashion as the hierarchy of allocators.

The memory allocator 205 may be responsible for allocating virtual and physical memory to the block allocator 210. The block allocator 210 may request a block of virtual memory from the memory allocator 205 and provide a size of the block of memory. In response, the memory allocator 205 may find a suitable contiguous block of virtual memory and return a virtual address of the start of the virtual memory to the block allocator 210.

The memory allocator 205 may have a range of addresses (e.g., from 0 to N) that indicate physical memory elements (e.g., bytes) that are addressable via physical addresses. The memory allocator 205 may also have a range of virtual addresses (e.g., from 0 to M) that indicate virtual memory elements that are addressable via virtual addresses. The number of virtual addresses may be greater than the number of physical addresses. As a result, virtual addresses may not all be concurrently mapped to physical memory. The memory allocator 205 may be implemented as an operating system (OS) or some other component.

A page of memory (hereinafter often referred to simply as a page) is a fixed-length block of memory that is contiguous in both physical and virtual memory addressing. In other words, the addresses of a page will not be scattered throughout physical or virtual memory. For example, if physical memory has logical addresses from 0 to N (where N is some number), a page may reside in physical memory having a range of addresses $X_1$ to $Y_1$ where $X_i >= 0$ and $Y_i <= N$. Similarly, if virtual memory has logical addresses of 0 to M, a page may be associated with a range of virtual memory addresses $X_2 >= 0$ and $Y_2 <= M$.

A virtual page may have the same or a different size than a physical page or memory. A physical page may be mapped to multiple virtual ranges (e.g., to implement shared memory). A virtual page may be mapped to multiple contiguous or non-contiguous physical pages.

The size of a page may correspond to a smallest amount of physical memory allocation allowed by an operating system for use by an application, the smallest amount of data that is allowed to be transferred between main memory and other storage such as a hard disk, or some other size. In some operating systems, a page size is 4 kilobytes (KB), although there is no intention to limit page sizes to 4 KB or to any other number. In some operating systems, there may be multiple page sizes. Aspects of the subject matter described herein may be applied to various page sizes.

A range of virtual addresses (hereinafter sometimes referred to as a virtual page) may or may not be mapped to physical memory. For example, in response to a request to allocate virtual pages, the memory allocator 205 may obtain a range of virtual memory addresses. After the range of virtual memory addresses has been obtained, the block allocator 210 may request that physical pages be reserved for virtual pages. In response, the memory allocator 205 may send an acknowledgment to the block allocator 210 that physical pages are reserved for the virtual pages. Reserving physical pages does not necessarily mean that actual physical pages have been obtained and mapped to the virtual pages. For example, reserving physical pages may include changing a counter of used physical pages without actually mapping the physical pages to one or more virtual pages. Reserving a physical page for a virtual page is sometimes referred to herein as committing the physical page to a virtual page.

In one embodiment, when the memory allocator 205 reserves physical pages for virtual pages, the memory allocator 205 may, at that time, map the virtual pages to the physical pages. In another embodiment, the memory manager 205 may wait until the first time a process attempts to access memory in a virtual page before mapping the virtual page to a physical page. Access as used herein may include reading data, writing data, deleting data, updating data, a combination including two or more of the above, and the like.

Sequential pages in virtual memory may map to non-sequential pages in physical memory. For example, pages have starting virtual addresses of 1000, 2000, 3000, and 4000, may map to pages in physical memory having starting physical addresses of 5000, 3000, 4000, 2000.

The memory consumers 215-218 may request blocks of contiguous virtual memory from the block allocator 210 or the low level memory allocator 205. Some examples of memory consumers include heap managers, database components (e.g., a buffer pool manager, a query execution manager, and the like), other processes that need larger blocks of memory, and the like. A memory consumer may be an end consumer or a memory provider to another memory consumer. For example, a heap manager may provide memory to a program that seeks memory to perform various functions.

Figure 3:
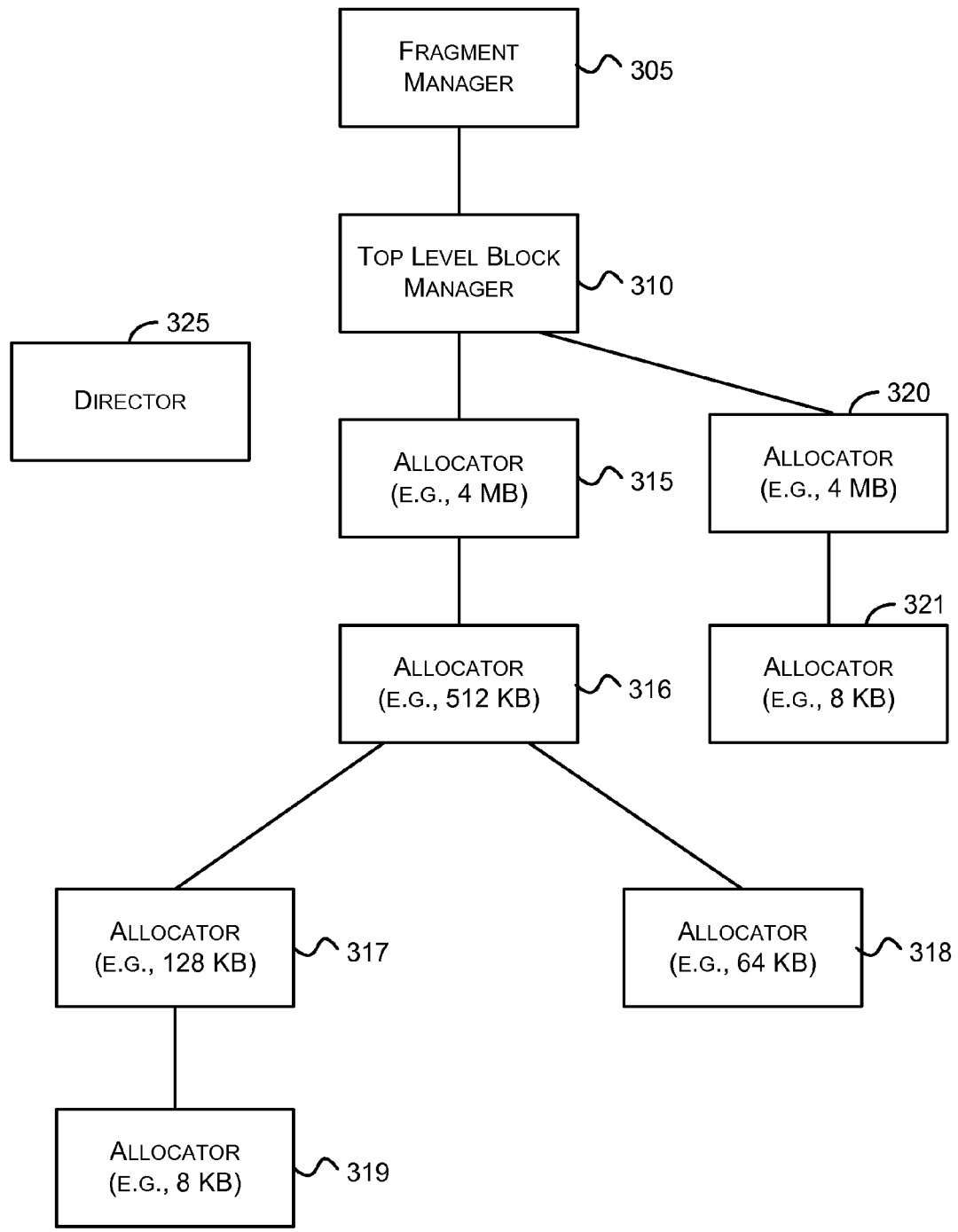
FIG. 3 is a block diagram that illustrates exemplary components of an exemplary allocator in accordance with aspects of the subject matter described herein.

The block allocator 210 may be comprised of subcomponents as illustrated in FIG. 3, which is a block diagram that illustrates exemplary components of an exemplary allocator in accordance with aspects of the subject matter described herein. The exemplary components illustrated in FIG. 3 include a fragment manager 305, a top level block manager 310, allocators 315-321, a director 325, and may include more, fewer, or other components (not shown).

The fragment manager 305 obtains (e.g., from the OS) fragments in the virtual address space. A fragment is a single contiguous portion of the virtual address space. A fragment may be committed or non-committed to physical memory. A fragment may be of various sizes. For example, in one implementation a fragment is 4 Megabytes (MBs). In another implementation, a fragment is the total size of physical memory. The examples above are not intended to be all-inclusive or exhaustive of fragment sizes. Indeed, in other implementations, a fragment may be other sizes, without departing from the spirit or scope of aspects of the subject matter described herein.

The top level block manager 310 obtains blocks of memory from the fragment manager 305. A block obtained from a fragment manager may be the same size as or smaller than the fragment 305. After obtaining a block of memory from the fragment manager 305, the top level block manager 310 may divide the block into sub-blocks for allocating to other memory allocators.

Each of the allocators 315-321 has a parent allocator from which it may obtain additional memory when needed. For example, the top level block manager 310 is the parent allocator for the allocators 315 and 320. As another example, the allocator 316 is the parent allocator for the allocators 317-318.

An allocator may be responsible for maintaining data structures that indicate memory that is available for allocation to a consumer. An allocator may also be responsible for returning blocks of memory to its parent allocator after such blocks are no longer needed.

Each of the allocators 315-321 requests blocks of a certain size. For example the allocators 315 and 320 may request blocks 4 MB in size while the allocators 316-319 and 321 may request blocks of 512 KB, 128 KB, 64 KB, 8 KB, and 8 KB, respectively.

Once it has received a block, an allocator may divide the block into parts for use in providing to consumers. The term consumer may refer to a child allocator or an end consumer. When an allocator receives a request for memory, the allocator may first determine whether it currently has sufficient free memory to fulfill the request. If the allocator has sufficient free memory, the allocator may provide the memory to the requestor. If the allocator does not have sufficient free memory, the allocator may request an additional memory block from its parent allocator, which may request an additional memory block from its parent and so forth, if needed. If the top level block manager 310 does not have sufficient free memory, the top level block manager 310 may request additional memory from the fragment manager 305.

The director 325 may determine (e.g., select) an allocator to use to fulfill a request for memory. To do this the director 325 may traverse a tree that indicates the sizes of blocks allocated by each of the allocators and find a suitable allocator to fulfill the request. Here, a "suitable" allocator is the allocator that is closest to the size of the request while being large enough to provide a block the size of the request. The director 325 may also take into consideration lifetime characteristics, proximity to consumer, and other factors as described later. It may be said that the director selects a memory allocator from a set of allocators to satisfy a request based on the memory sizes allocated by the memory allocators as well as the memory size requested.

The director 325 may be implemented as code (e.g., a function or component) that is called to determine an appropriate allocator. Where there is more than one workspace, there may be multiple directors (e.g., one for each workspace) or a single director may also have logic for determining the appropriate workspace from which to select an allocator.

In one embodiment, a memory consumer may indicate a particular workspace from which to select an allocator. In another embodiment, a director may be constrained to select an allocator from the workspace indicated by a memory consumer. In yet another embodiment, a director may take the indication as a hint but not be constrained to follow the hint.

For example, if a consumer requested a 16 KB block, the director 325 could obtain this block by using the allocator 318 but not by using the allocator 319. As another example, if a consumer requested an 8 KB block, the director 325 may determine based on lifetime characteristics or other factors that the allocator 321 is more suitable than the allocator 319 for satisfying the request.

The number, type, and structure of the allocators may be selected to be adapted for a specified type of memory consumer. Here "type" refers to the size of blocks that an allocator deals with while "structure" refers to the parent/child relationships between allocators. For example, with knowledge of a pattern of a particular database's memory allocations, a tree of allocators suitable for the database may be created to reduce overhead in allocating memory for the database. Furthermore, a memory consumer may configure the tree of allocators prior to or during runtime to optimize the allocators for the consumer's particular memory allocation requests.

Figure 4:
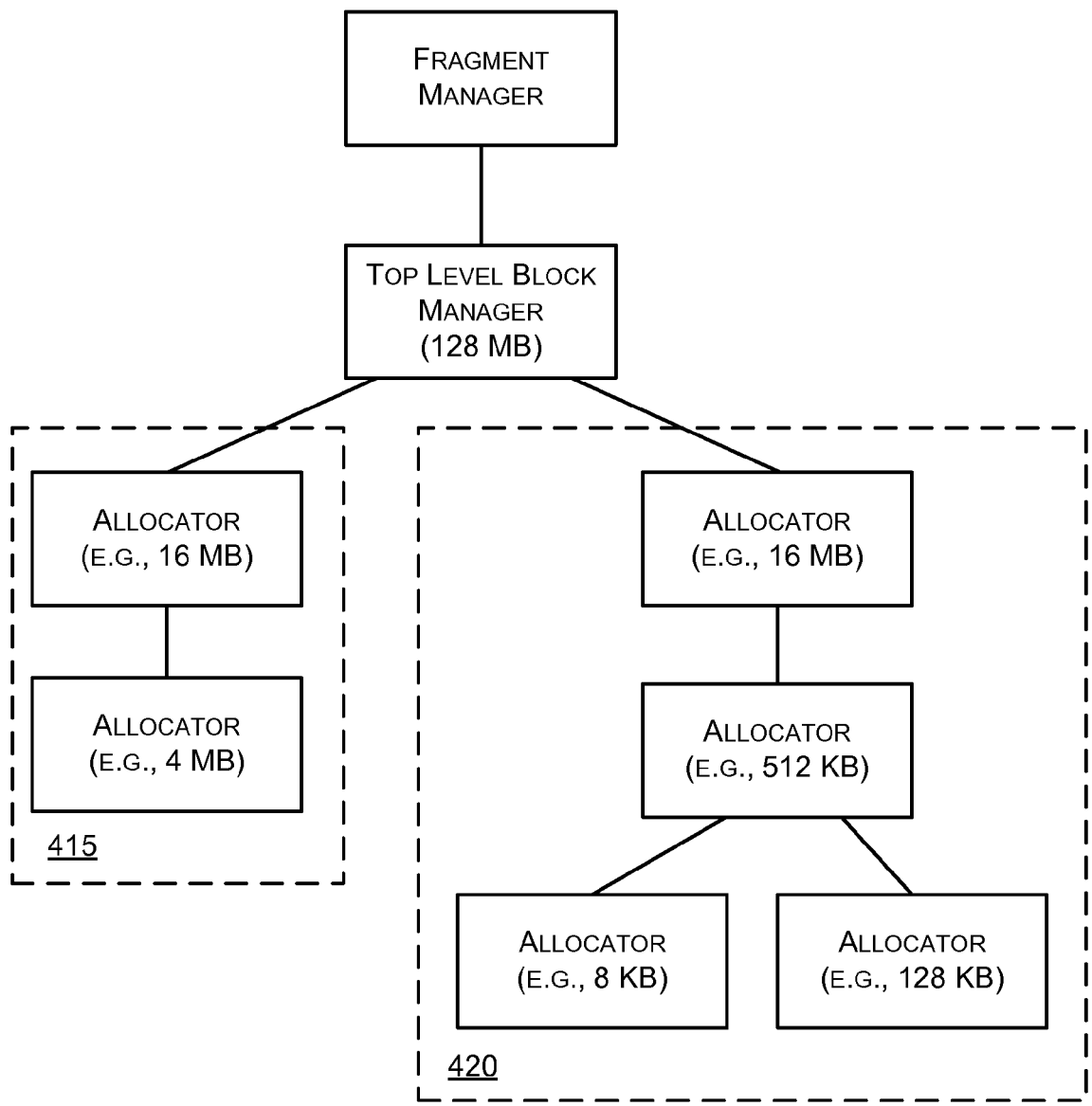
FIG. 4 is a block diagram that generally represents exemplary allocators that are in different workspaces in accordance with aspects of the subject matter described herein.

The allocators may be separated into workspaces as illustrated in FIG. 4, which is a block diagram that generally represents exemplary allocators that are in different workspaces in accordance with aspects of the subject matter described herein.

FIG. 4 illustrates two workspaces 415 and 420 with allocators located therein. One reason to have separate workspaces is related to the expected lifetime characteristics of block allocations. For example, one memory consumer may obtain and then relatively quickly release memory blocks while another memory consumer may hold on to memory blocks for a relatively longer period of time.

When block allocations requests of the same relative lifetime characteristics are routed to allocators in the same workspace, this may assist in reducing fragmentation. For example, after a program indicates that the memory of a block may be de-allocated, an allocator may return the allocated block to a parent allocator. If the block returned to the parent allocator is within a block of memory that has no other outstanding allocated blocks, this block may also be de-allocated and returned to a parent of the parent block and so forth. Doing this defragments memory blocks. Having allocations of similar lifetime characteristics allocated from the same workspace can thus assist in defragmenting memory.

The lifetime characteristics of a block allocation may be determined statically based on knowledge about a memory consumer (e.g., buffer pool pages of a database may have predictable lifetime characteristics), dynamically (e.g., from runtime analysis of allocation and de-allocation requests for a requestor of memory), explicitly (e.g., by the memory allocation requestor indicating the lifetime characteristics of the allocations), some combination of the above, or the like. Allocators may be partitioned into multiple workspaces at any level in the hierarchy not just right below the top level block manager. In addition, memory assigned to a workspace that is free or becomes free may be reassigned to another workspace.

When an allocator obtains a block of memory from its parent allocator, the allocator may divide the block into sub blocks that are the size that the allocator may give to consumers or other allocators that request blocks from the allocator. For example, if a 4 KB allocator obtains a 16 KB block from its parent allocator, the allocator may divide the block into 4 4 KB sub blocks.

An allocator may maintain a data structure regarding the block of memory. This data structure may include, for example, size of the block, the starting address of the block, a list of sub blocks that are available in the block, state regarding each block, other data regarding each block, and the like.

A block may by identified in any one of several states including active, full, partially full, and empty. When a block is first given to an allocator, the block may be identified as active, empty, or one of the other states. An active block is a block that the allocator first attempts to use to satisfy new allocation requests from consumers. In one embodiment, only one of the blocks of an allocator is marked as active. In another embodiment, more than one block of the allocator may be marked as active.

Once a block of an allocator has been totally allocated (e.g., each of the sub blocks of the block have been allocated), the block may be marked or otherwise associated with the state full. At this time, another block may be marked as active.

When memory in a full block is returned to an allocator, the allocator may then mark the block as partially full. In addition, the allocator may update a data structure that classifies blocks according to fill factors (e.g., how full the block are) associated with the blocks.

Figure 5:
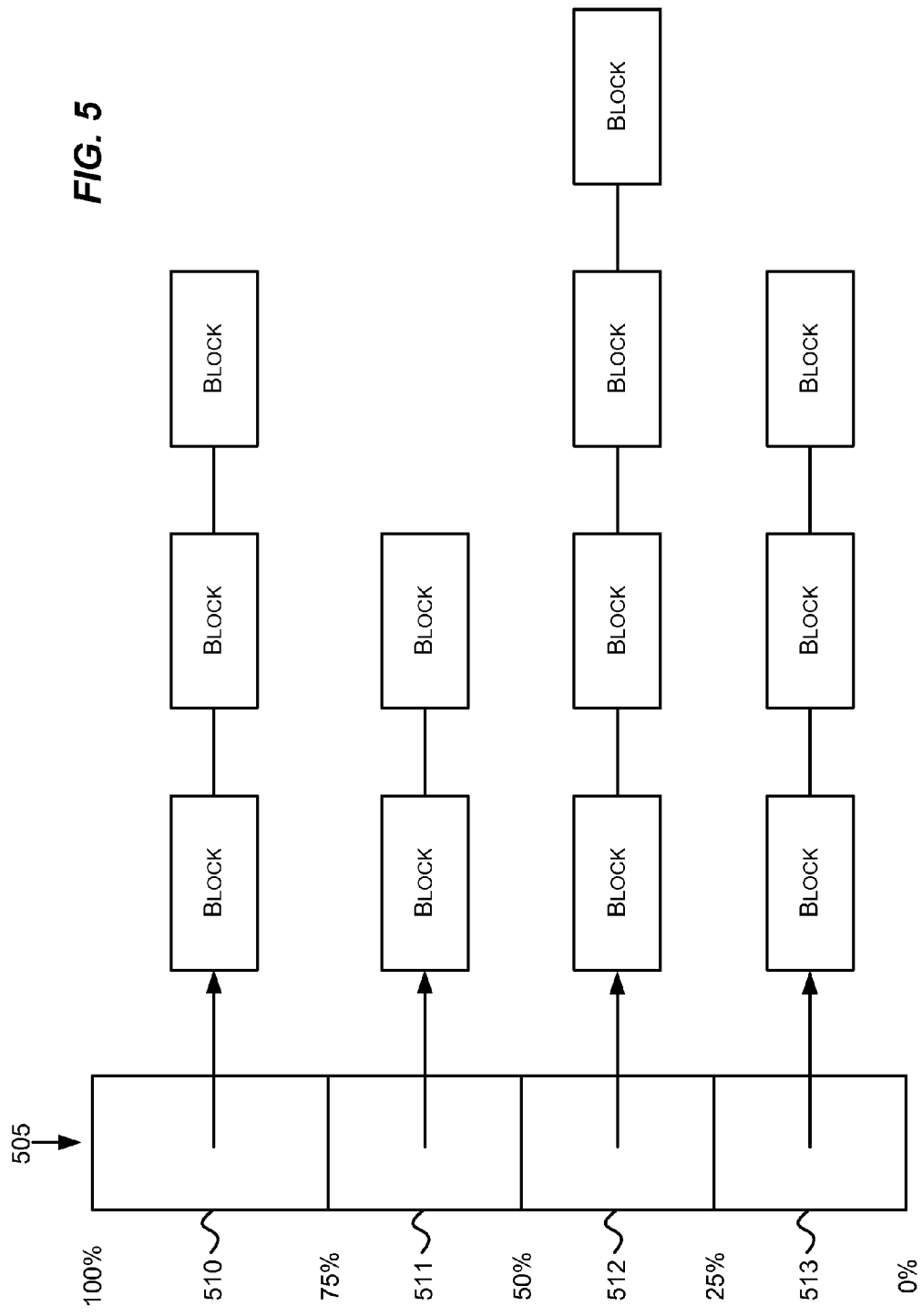
FIG. 5 is a block diagram that generally represents an exemplary data structure for classifying the fill factor of memory blocks in accordance with aspects of the subject matter described herein.

FIG. 5 is a block diagram that generally represents an exemplary data structure for classifying the fill factor of memory blocks in accordance with aspects of the subject matter described herein. The exemplary data structure 505 illustrated in FIG. 5 is a bucketized data structure that includes 4 buckets set at 25% increments, but other data structures may have more or fewer buckets with different and possibly non-uniform ranges of percentages or other units of measure.

Each of the buckets 510-513 may refer to a list of blocks that have varying fill factors. For example, the blocks referenced by the bucket 510 may have fill factors between 75% and 100%, the blocks referenced by the bucket 511 may have fill factors between 50% and 75%, the block referenced by the bucket 512 may have fill factors between 25% and 50%, and the blocks referenced by the bucket 513 may have a fill factors between 0% and 25%. The number of buckets for each allocator may be configurable. For classification purposes, where the size of a block of memory is not already a multiple of a physical page size, the size of a block of memory may be rounded up to a multiple of the physical page size.

When an active block is not able to fulfill an allocation request, the data structure 505 may be used to select a new active block that is able to fulfill the allocation request. For example, if an active block is not able to fulfill an allocation request, the allocator may select a bucket (e.g., based on the fill factor), and obtain a block from which to allocate the request. In one embodiment, the allocator may start with the bucket having the greatest fill factor and move to a bucket having a lesser fill factor and so forth until a block is found to satisfy the request.

After the block is found, it may be marked as active and memory may be allocated from the block for use by the consumer. In addition, the block that was previously marked as active may be marked as full or partially full as appropriate. In one embodiment, when the allocator allocates a block from a bucket, the allocator may also re-classify the block to another bucket, if appropriate. In another embodiment, an allocator may re-classify a block into another bucket only when the block is freed.

When all the sub blocks of a block have been freed, an allocator may mark the block as empty and return the block to the allocator's parent allocator. As mentioned previously, new requests for memory allocations may be directed to blocks with a higher fill factor. This may allow partially filled blocks to be freed and returned to their parent allocators. This concept may be extended to create hierarchy of partially filled blocks so that global decisions may be made about selecting new active blocks (at each level in the hierarchy) and chances may be improved to release memory all the way to the top level.

Some environments may benefit by having more than one active block per allocator. For example, where an allocator may be called by many requestors, the contention of access to the allocator may be sufficient to justify several active blocks. The number of active block(s) blocks per allocator may be fixed, configurable, or dynamically determined based on hardware, knowledge of allocation patterns, contention, other factors, and the like. For example, a software developer may set a fixed number of active block(s) for each allocator. As another example, a system administrator, end user, software process (e.g., consumer), or the like may configure the number of active block(s) for an allocator. As another example, based on the contention to allocate from an allocator or the contention associated therewith, an allocator may increase or decrease the number of active block(s) by marking or unmarking additional blocks as active. Blocks that are marked as active may be used concurrently in satisfying requests for memory allocations.

An allocator that has increased the number of active blocks (s) may increase the number of active blocks again if high contention warrants that action (e.g., a contention threshold is reached). Similarly, an allocator that has decreased the number of active blocks may further decrease the number of active blocks again if the contention level falls (and there will be at least one active block remaining).

Figure 6:
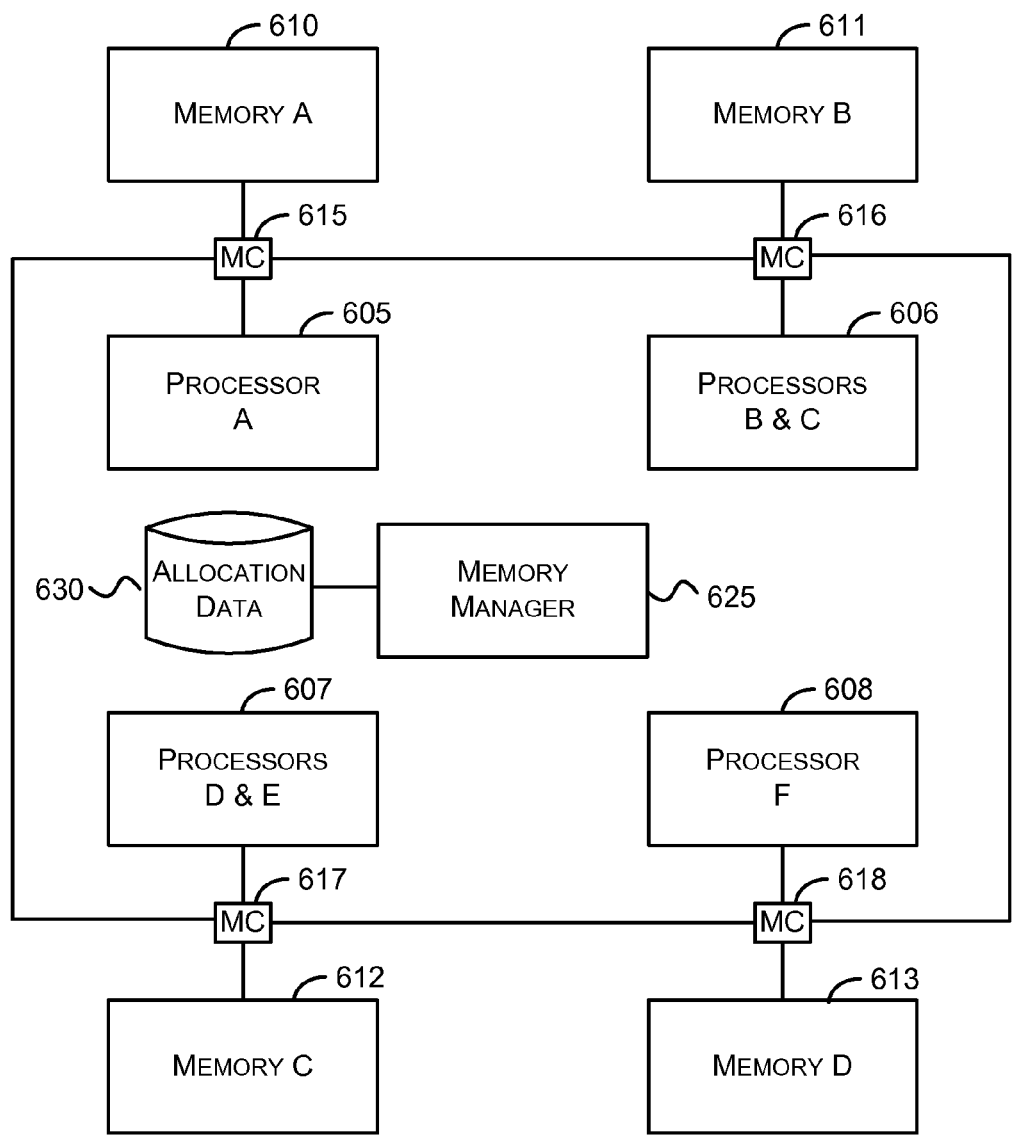
FIG. 6 is a block diagram that generally represents an environment having multiple processors and memories in which aspects of the subject matter described herein may be implemented.

Memory may be separated from a processor by zero or more hops which may lead to different latencies. For example, FIG. 6 is a block diagram that generally represents an environment having multiple processors and memories in which aspects of the subject matter described herein may be implemented. The environment includes processors 605-608, memories 610-613 (sometimes referred to as memory modules), memory controllers 615-618, memory manager 625, a store 630, and may also include other entities (not shown).

The store 630 comprises any storage media capable of storing data particularly hierarchical data structures that include information about block allocations. The hierarchical data structures have at least some blocks of memory that have parent/child relationships. The term data is to be read to include information, program code, program state, program data, other data, and the like. The store 630 may comprise a file system, database, volatile memory such as RAM, other storage, some combination of the above, and the like and may be distributed across multiple devices. The store 630 may be external, internal, or include components that are both internal and external to an apparatus hosting the memory manager 625.

The store 630 may also include data that indicates time characteristics (e.g., estimated allocation periods) of the blocks of memory. An allocator may be operable to consider a time characteristic of an active block in conjunction with satisfying a memory allocation request.

The memories 610-613 may be implemented as RAM, ROM, EEPROM, flash memory or as other memory technologies that provide relatively fast memory access (e.g., compared to rotational, tape, or other mechanical storage).

Each processor may be linked to a memory controller and some processors (e.g., the processors 606 and the processors 607) share memory controllers. The memory controllers may be linked such that memory controller 615 is directly connected to memory controller 616 and memory controller 617 while memory controller 618 is directly connected to memory controller 616 and memory controller 617.

To access memory 610, the processor 308 may issue a memory access request to memory controller 618. The memory controller 618 may send the request to memory controller 616 or memory controller 617. The memory controller to which the request was sent may forward the request to the memory controller 615 which may then access the memory 610 as requested.

As can be seen from the example above, accessing distant memory may involve traversing multiple components. Accessing closer memory may involve traversing fewer components (e.g., such as a single memory controller). With other things (e.g., contention for memory) being equal, accessing distant memory will often take more time than accessing closer memory.

The components of FIG. 6 may interface with a memory manager 625 (e.g., an operating system) that manages (e.g., allocates and de-allocates) memory from the memory 610-613. For fastest access, a memory requestor may desire to have a block of memory in a memory closest to the memory requestor. A memory requestor may have to deal with various possibilities in obtaining memory allocation from the memory manager 625. For example, a memory requestor (e.g., a processor) may be able to indicate a specific memory controller from which memory is to be allocated to the memory requestor. For example, the processor 605 may be able to indicate that the allocated memory is to come from the memory 610. In this example, the processor may be able to count on obtaining memory from a specified location.

In some implementations, however, a memory requestor may only be able to hint that the memory requestor be given memory closest to the processor for a memory allocation request. The memory manager 625 may use the hint in its consideration of which physical memory to allocate to the memory requestor, but the memory manager 625 may ultimately determine to give the memory requestor memory that is suboptimal (e.g., further away than the closest memory) to the memory requestor.

In this case, the memory requestor may attempt to obtain closer memory through other means. For example, in one embodiment, the memory requestor may request additional memory in the hopes of obtaining closer memory. Once the additional memory has been obtained, the requestor may release the suboptimal memory. In another embodiment, where the memory requestor is an allocator, the memory allocator may maintain data that indicates the physical location of the memory and may use this data to allocate physical memory to consumers based on latency of the memory to the consumer. For example, if a memory allocator has a block of memory that spans memory 610 and memory 611 and the memory allocator receives a request from a consumer on processor 605, the memory allocator may attempt to satisfy the request from a block in memory 610.

If the memory allocator does not have sufficient memory on the memory 610, the memory allocator may request an additional memory allocation in the hopes of obtaining physical memory from the memory 610 or the memory allocator may allocate a memory that is more distant to the consumer.

With an architecture such as the one illustrated in FIG. 6, a memory allocator may have an active block per processor, an active block for each set of processors that share memory, a single active block for all processors, or a different arrangement of active blocks as described previously. The number of active blocks may be adjusted dynamically depending on contention for the active blocks.

Although the environments described above includes various numbers of the entities, it will be recognized that more, fewer, or a different combination of these entities and others may be employed without departing from the spirit or scope of aspects of the subject matter described herein. Furthermore, the entities and communication pathways mentioned above may be configured in a variety of ways as will be understood by those skilled in the art without departing from the spirit or scope of aspects of the subject matter described herein.

Figure 7:
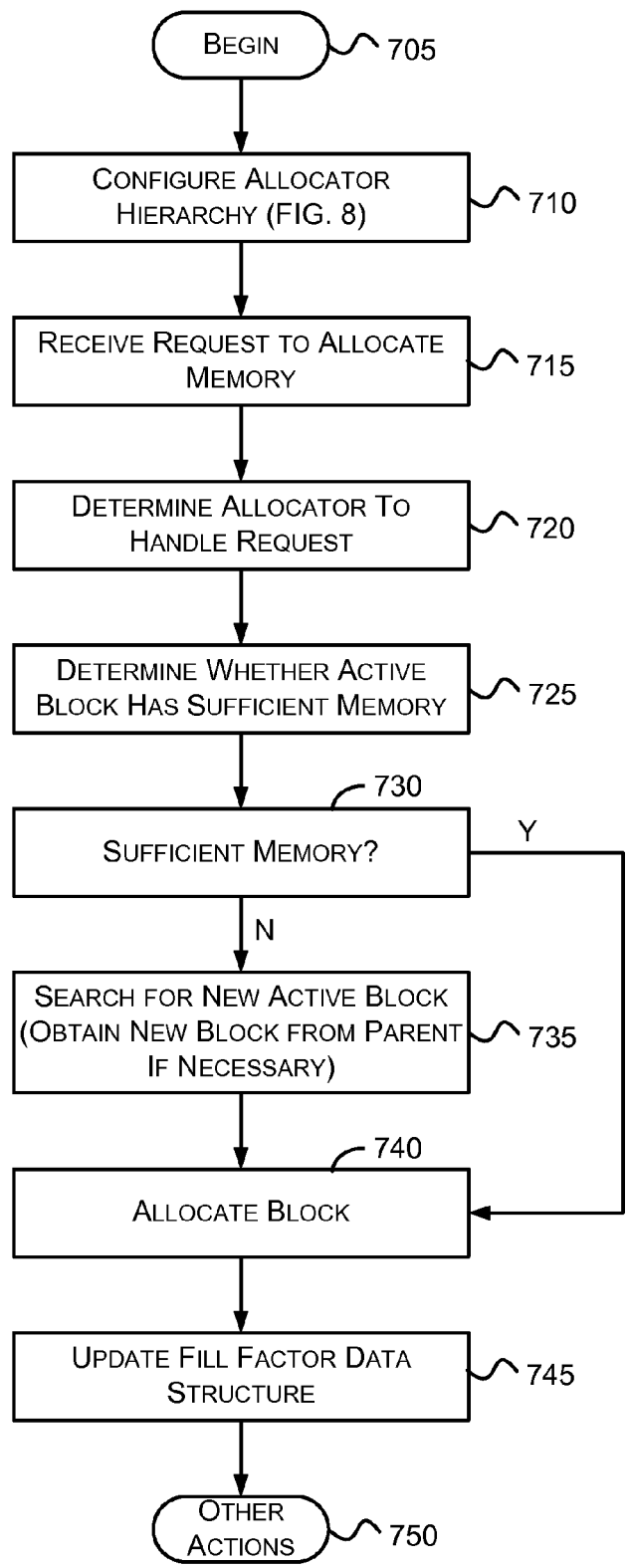
FIGS. 7-8 are flow diagrams that generally represent actions that may occur in accordance with aspects of the subject matter described herein.
Figure 8:
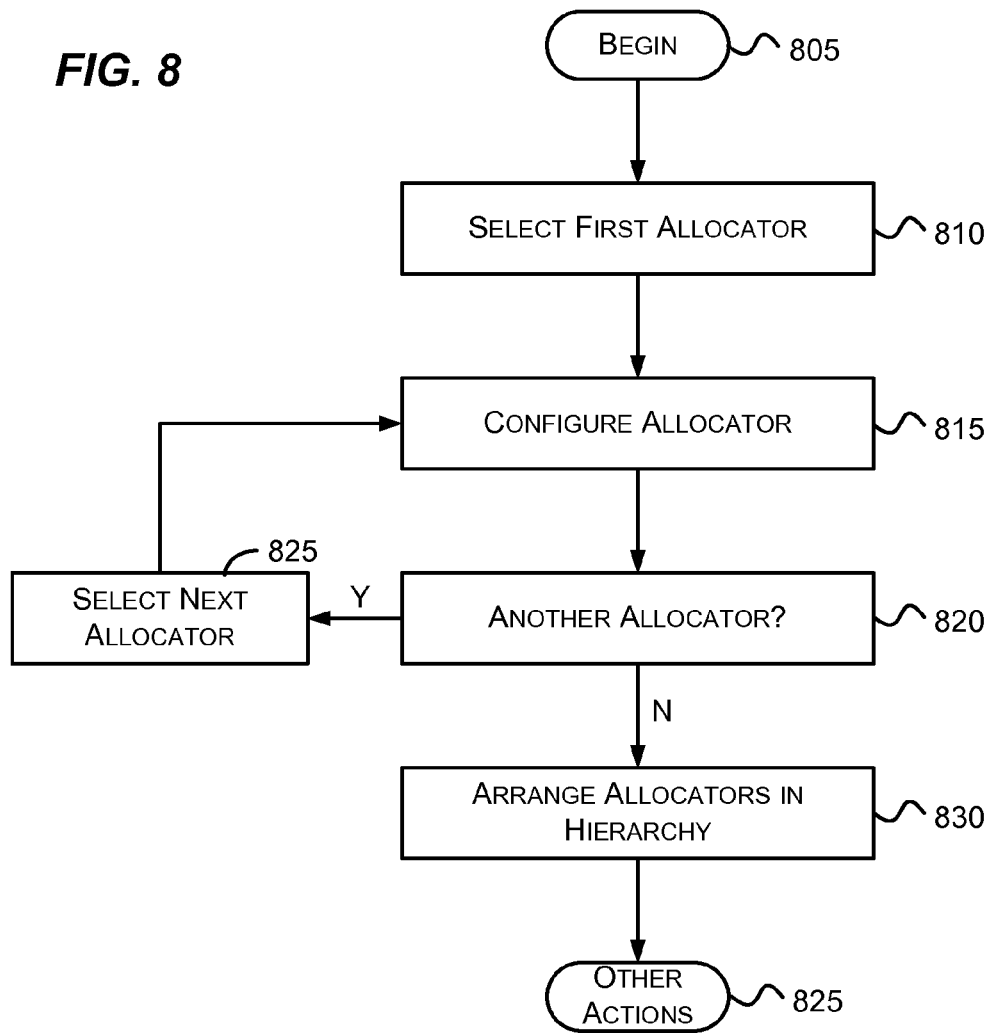

FIGS. 7-8 are flow diagrams that generally represent actions that may occur in accordance with aspects of the subject matter described herein. For simplicity of explanation, the methodology described in conjunction with FIGS. 7-8 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 7, at block 705, the actions begin. At block 710, an allocator hierarchy is configured. For example, referring to FIG. 3, allocators may be configured in the exemplary hierarchy illustrated there. Note that configuring an allocator hierarchy may involve initializing one or more data structures (e.g., to indicate memory assigned to various allocators), instantiating one or more allocators, setting up relationships between allocators, or the like.

At block 715, a request to allocate memory is received. For example, referring to FIG. 3, the director 325 may receive a request to allocate memory from a memory consumer.

At block 720, a determination is made as to the allocator to use to handle the allocation request. Making this determination may involve navigating a tree data structure to find an appropriate memory allocator based on the allocation size of the memory allocator. The tree data structure may define relationships between children allocators and parent allocators as well as indicate allocations sizes associated with each allocator. The tree data structure may also indicate (and be partitioned based on) predicted lifetime characteristics of the allocators. For example, referring to FIG. 3, if the memory consumer requests 16 KB, the director 325 may select the allocator 318 to handle the allocation request.

At block 725, a determination is made as to whether an active block of the allocator has enough free memory to satisfy the request. If the allocator has multiple active blocks, the active block selected for satisfying the request may be based on predicted lifetime characteristics of the memory allocation, proximity of physical blocks of memory in the active block to the memory consumer, other factors, and the like. For example, referring to FIG. 3, the allocator 318 may determine whether it has 16 KB free to allocate to a consumer.

At block 730, if there is sufficient free memory to allocate to the consumer, the actions continue at block 740; otherwise, the actions continue at block 735.

At block 735, a search to find a new active block is performed. This search may use a data structure that organizes blocks according to associated fill factors. For example, referring to FIG. 5, the data structure 505 may be searched to find a new active block with sufficient free space to allocate to the consumer. If no block of an allocator has sufficient free space to satisfy the request, an additional memory allocation may be requested from a parent allocator of the memory allocator and this additional memory allocation may be used to satisfy the request.

At block 740, memory from active block is allocated to satisfy the request. For example, referring to FIG. 3, memory from an active block of the allocator 318 may be used to satisfy the request.

At block 745, the fill factor data structure may be updated as appropriate. For example, referring to FIG. 5, if a block of the allocator 318 becomes completely full after allocating the memory requested, the block may be placed in to a list of completely full blocks. Indicating that a block is completely full may be deferred until an unsuccessful attempt to allocate from the block.

In addition, instead of placing a block into a list of completely full blocks, full blocks may be indicated in another way. For example, in one embodiment, full blocks may be indicated by any blocks that are not marked as partially full or empty. In one sense, in this embodiment, full blocks may not be included in a list and may be referred to as "free floating."

If a block is not completely full after the allocation, the fill factor of a block may be increased and the block may be placed in a different bucket based thereon, if appropriate. Changing the fill factor for a block may be deferred until allocation time.

At block 750, other actions, if any, may be performed. Other actions may include, for example, the activities of creating (e.g. marking), maintaining, and removing active blocks based on contention.

FIG. 8 is a flow diagram that generally represents some exemplary actions corresponding to block 710 of FIG. 7 that may occur in configuring allocators in accordance with aspects of the subject matter described. Again, it is noted that the sequence of the actions described in FIG. 7 is exemplary only. Based on the teachings herein, those skilled in the art may recognize many other sequences of actions that may be performed to configure allocators without departing from the spirit or scope of aspects of the subject matter described herein. At block 805, the actions begin.

At block 810, a first allocator is selected. For example, referring to FIG. 3, the fragment manager 305 may be selected.

At block 815, the allocator is configured. For example, referring to FIG. 3, the fragment manager 305 may be configured as a parent allocator of the top level block manager 310. The size of the fragments obtained by the fragment manager 305 may also be configured. For other allocators configuring the allocators may involve setting a size of the allocator, parent/child relationships, updating a data structure to initialize data regarding the initial memory allocated by each allocator (e.g., indicating that the allocator has no memory at startup), indicating lifetime characteristics of the allocator, initializing a data structure to hold markings for blocks of each allocator, and the like.

At block 820, a determination is made as to whether another allocator exists in the hierarchy. If so, the actions continue at block 825; otherwise, the actions continue at block 830.

At block 825, another allocator is selected for configuration. For example, referring to FIG. 3, the allocator 315 may be selected for configuration.

At block 830, the allocators are arranged in a hierarchy. For example, referring to FIG. 3, the allocators may be associated in parent/child relationships. This action of arranging the hierarchy may instead be done while configuring each allocator at block 815.

At block 825, other actions, if any, may be performed.

As can be seen from the foregoing detailed description, aspects have been described related to memory management. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   receiving a request to allocate memory;
   determining whether an active block has enough free memory to satisfy the request;
   if the active block has enough free memory to satisfy the request, allocating memory to satisfy the request from the active block; and
   if the active block does not have enough free memory to satisfy the request, using a data structure that organizes blocks according to associated fill factors to search for a new active block to satisfy the request.

2. The method of claim 1, further comprising, determining a new fill factor for a block that has had memory allocated from it or freed to it and updating the data structure to indicate that the block is associated with the new fill factor.

3. The method of claim 2, wherein updating the data structure comprises updating a bucketized data structure, each bucket of the bucketized data structure referencing zero or more blocks having a corresponding fill factor.

4. The method of claim 1, wherein using a data structure that organizes blocks according to associated fill factors comprises using a data structure that classifies blocks into buckets based on a percentage of available or allocated memory in the blocks, each bucket corresponding to a range of one or more percentages of available or allocated memory.

5. The method of claim 1, wherein using a data structure that organizes blocks according to associated fill factors to search for a new active block to satisfy the request comprises searching the data structure in an order in which blocks with a greater fill factor are searched before blocks with a lesser fill factor.

6. The method of claim 1, further comprising handling the request via a memory allocator having memory block sizes larger than the memory requested and requesting additional memory allocation from a parent allocator of the memory allocator if no blocks of the memory allocator have sufficient memory to satisfy the request.

7. The method of claim 1, further comprising selecting a memory allocator to handle the request by navigating a tree data structure to find the memory allocator based on an allocation size of the memory allocator, the tree data structure referencing the memory allocator as well as other memory allocators, the tree data structure defining relationships between children allocators and parent allocators, the tree data structure further indicating allocation sizes associated with the allocators.

8. The method of claim 7, further comprising receiving data defining the children allocators and the parent allocators and the relationships and creating the tree data structure therefrom, the data adapted for creating a hierarchy of memory allocators for a specified memory consumer.

9. The method of claim 7, wherein selecting a memory allocator to handle the request further comprising determining an allocator based on a lifetime characteristic determined for the request, the allocators in the tree data structure being partitioned based on predicted lifetime characteristics of memory allocations.

10. The method of claim 1, further comprising based on contention for the active block, creating another active block, maintaining the active block, or removing the active block.

11. A computer storage medium having computer-executable instructions, which when executed perform actions, comprising:
   configuring a first memory allocator to allocate memory of a first memory size in response to requests to allocate memory;
   configuring a second memory allocator to allocate memory of a second memory size in response to requests to allocate memory, the second memory size being smaller than the first memory size, the second memory allocator operable to obtain additional memory from the first memory allocator;
   receiving a memory allocation request for memory of a third memory size;
   selecting a memory allocator from the first and second memory allocators to satisfy the memory allocation request based on the first, second, and third memory sizes; and
   attempting to satisfy the request from an active block of the selected memory allocator, blocks of memory of the selected memory allocator being classified according to fill factors associated with the blocks of memory.

12. The computer storage medium of claim 11, further comprising selecting a sub block of the active block to allocate for the memory allocation request based on proximity to a processor that issued the memory allocation request.

13. The computer storage medium of claim 11, further comprising based on contention for the active block, marking another block as active.

14. The computer storage medium of claim 11, further comprising creating a bucketized data structure, each bucket of the bucketized data structure referencing zero or more blocks of memory having a fill factor.

15. The computer storage medium of claim 11, further comprising configuring a third memory allocator to allocate memory of the second memory size, the third memory allocator operable to request additional memory from the first memory allocator, the third memory allocator operable to allocate memory for memory allocation requests having a different lifetime characteristic than requests to allocate memory for the second memory allocator.

16. The computer storage medium of claim 15, further comprising determining the lifetime characteristic based on a runtime analysis of allocation and de-allocation requests of a requestor of memory.

17. In a computing environment, a system, comprising:
   a set of memory that includes allocable memory elements;
   a store having at least one data structure thereon that includes data regarding allocation of blocks of the memory, the at least one data structure arranged hierarchically in which at least some of the blocks of memory have parent/child relationships, an allocated block of memory of a child having been obtained from an allocated block of memory of a parent; and
   at least one allocator operable to determine whether a first active block of memory has enough free memory to satisfy a request, the allocator further operable to perform actions, comprising if the first active block of memory does not have enough memory to satisfy the request, determining a second active block to satisfy the request using one or more fill factors of blocks of memory managed by the at least one allocator.

18. The system of claim 17, wherein the set of memory includes multiple memory modules, each memory module having a lower latency to one or more processors than to one or more other processors, the at least one allocator further operable to consider latency of a memory module of the second active block in conjunction with determining the second active block.

19. The system of claim 17, wherein the store further includes data that indicates time characteristics of the blocks of memory, a time characteristic of a block of memory indicating an estimated allocation period for allocations of the block of memory, the at least one allocator further operable to consider a time characteristic of an active block in conjunction with satisfying the request.

20. The system of claim 17, wherein the at least one allocator is further operable to indicate that the second active block is to be used concurrently with the first active block in satisfying requests for memory allocations if contention for the first active block exceeds a threshold.

* * * * *